June 30, 1925.
M. W. HANKS
CONTROLLER ACTUATING DEVICE
Filed Oct. 19, 1922
1,544,314
2 Sheets-Sheet 1
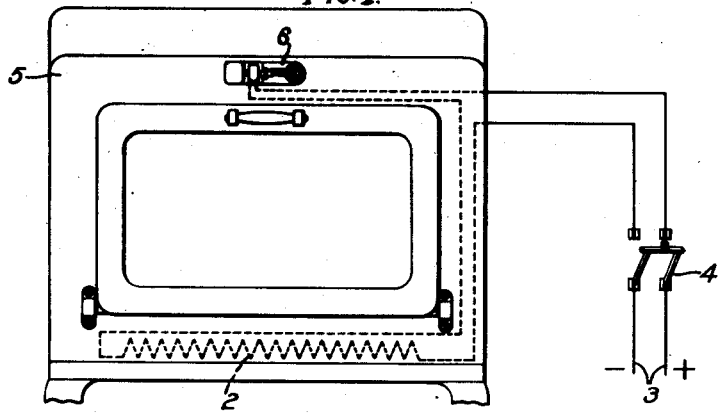
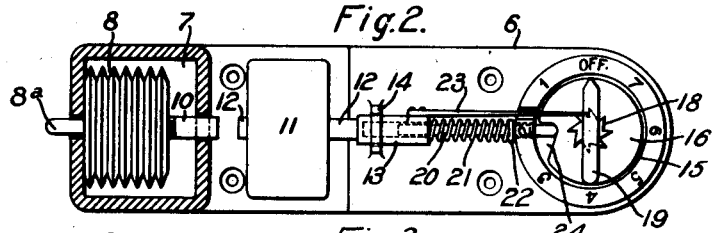
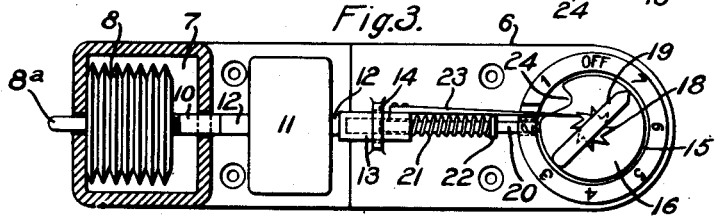
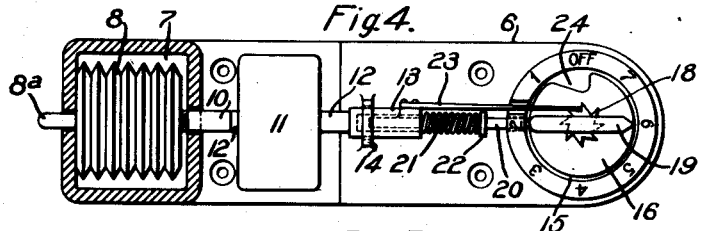
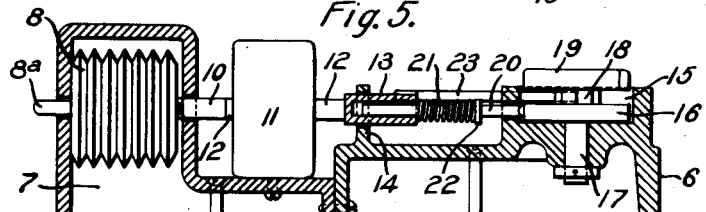
WITNESSES:
INVENTOR
Marshall W. Hanks.
BY
ATTORNEY June 30, 1925.
M. W. HANKS
1,544,314
CONTROLLER ACTUATING DEVICE
Filed Oct. 19, 1922       2 Sheets-Sheet 2
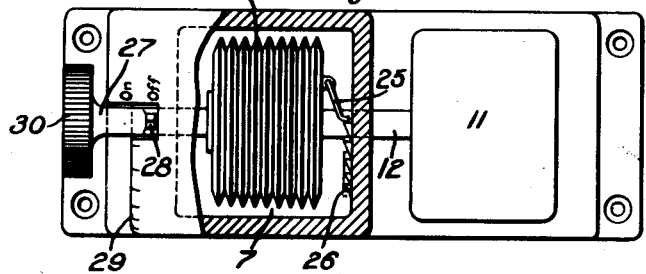
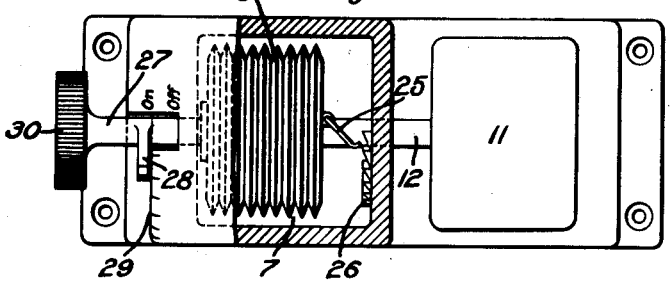
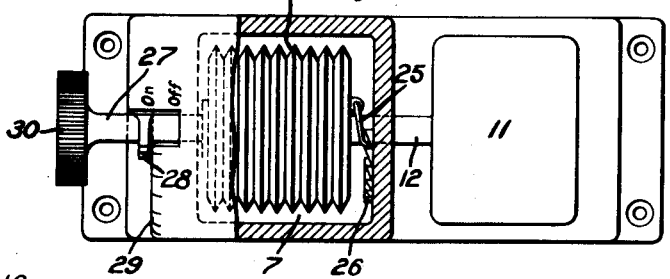
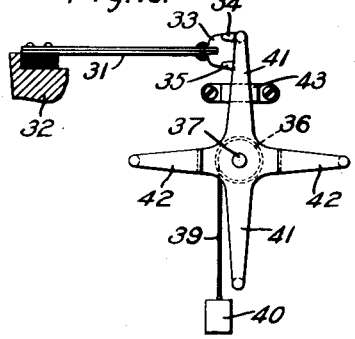
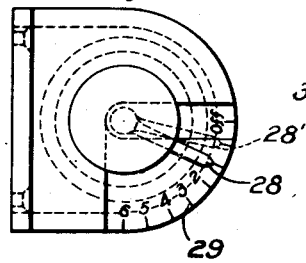
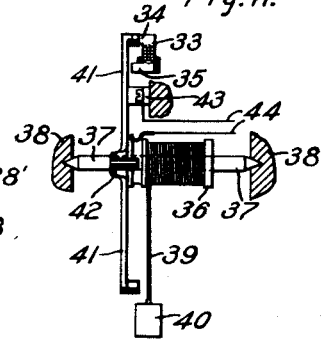
WITNESSES:
INVENTOR
Marshall W. Hanks.
BY
ATTORNEY Patented June 30, 1925.

1,544,314

UNITED STATES PATENT OFFICE.

MARSHALL W. HANKS, OF MADISON, WISCONSIN.

CONTROLLER-ACTUATING DEVICE.

Application filed October 19, 1922. Serial No. 595,539.

*To all whom it may concern:*

Be it known that I, MARSHALL W. HANKS, a citizen of the United States, and a resident of Madison, in the county of Dane and State of Wisconsin, have invented a new and useful Improvement in Controller-Actuating Devices, of which the following is a specification.

My invention relates to automatic controlling devices and particularly to means for automatically actuating a controlling device a pre-selected number of times in order to regulate or govern the actuating agent in accordance with predetermined conditions.

The object of my invention is to provide a simple and effective means for so regulating a normally variable actuating agent that it shall not exceed a predetermined value, by repeated corrective actions, the number of which may be predetermined.

My invention is intended primarily to control the operation of food-cooking ovens but it may be utilized in connection with heat or pressure-utilizing apparatus employed for other purposes.

My invention may utilize heat—generated either electrically or by combustion—or gas or liquid pressure as the agent to be maintained substantially uniform for any desired number of selected periods or repeat actions but, for convenience, I shall set forth my invention in connection with apparatus for utilizing electrically generated heat.

The employment of thermostats for cutting off the heat supply to cooking ovens when a certain predetermined temperature is reached is well known, and means for automatically reconnecting the heat supply have also been utilized but, so far as I am aware, a time-keeping mechanism has been the only means proposed for limiting the cooking period of ovens equipped with means for repeatedly connecting and disconnecting the heat-producing source.

In my Patent No. 1,375,695, granted April 26, 1921, I have set forth and claimed a thermostatic means for cutting off the heat-producing source from an oven and also a means for reconnecting such source upon a predetermined reduction in the temperature of the oven but the patent does not disclose any means for automatically limiting the number of reconnecting operations.

My present invention is applicable to the structure set forth in my above-mentioned patent but is not necessarily restricted to that structure.

My invention is illustrated in the accompanying drawings in which Figure 1 is a partially front elevational and partially diagrammatic view of an electrically heated oven equipped with my invention; Figs. 2, 3 and 4 are partially front elevation and partially sectional views of an attachment embodying my invention, the operating elements being in different positions in the three figures; Fig. 5 is a horizontal sectional view of the structure shown in Figs. 2, 3 and 4; Figs. 6, 7 and 8 are partially front elevational and partially sectional views of a modification of my invention; Fig. 9 is an end elevation of the structure shown in Figs. 6, 7 and 8, and Figs. 10 and 11 are a front and a side elevation, respectively, of a thermostatic repeat device of modified construction.

Referring to Figs. 1 to 5, inclusive, an oven 1 is shown as equipped with a heating unit 2 located at the bottom of the oven and supplied with electric current from a suitable circuit 3 having a manually-operated main-line switch 4. It is to be understood, however, that the invention is not limited to any number, type or location of heating units.

Attached to one side 5 of the oven 1 is a frame 6 that is provided with a chamber 7 in which is located a thermostat 8, here shown as of the bellows type. In case gas or liquid pressure were to be utilized instead of heat, the device 8 would be designed and adapted for operation by such pressure.

The chamber 7 may be connected to the interior of the oven 1 by means of an opening or passage 9, as shown in Fig. 5, or the device 8 may be subjected to the heat of the air and steam discharged from the oven otherwise than into the chamber 7. The reasons for locating the thermostat outside the oven to be operated by heat discharged through a passage from the interior of the oven are fully set forth in my above-mentioned patent.

The outer end of the thermostat is located adjacent to the outer end wall of the chamber 7 and may be provided with a pin 8ª by means of which manual operation may be effected. The inner end of the device 8 is provided with a pin 10 that projects loosely through the other end wall of the chamber.

The movable member of a circuit-opening switch or other control device, which is located in the box 11, is provided with a pin 12 that projects through both ends of the casing. The switch may be of any well known and suitable form which will open the circuit of the heating unit 2 when the pin 12 is moved to the position shown in Figs. 2, 4 and 5 and is closed when the pin is moved to the position shown in Fig. 3, or it may be an adjustable rheostat, the operation and function of which are well known in the art. The right-hand end of the pin 12 is provided with a sleeve member 13 that is mounted for free longitudinal movement in a bracket 14.

In case fluid pressure is the agent to be governed, the controller 11 will, of course, embody a cock or valve for varying or cutting off the pressure when actuated by the device 8 or if heat to be regulated is generated by gas combustion, the supply of gas to the burner or burners will be varied by a cock or valve represented by the device 11 and actuated by the device 8.

The right-hand end of the frame 6 has a cylindrical recess 15 to receive a cam 16 which is mounted upon a shaft 17. A ratchet wheel 18 and a pointer arm 19 are rigidly connected to the cam 16, and the rim surrounding the recess 15 is provided with suitable index marks, here shown as "Off" and I, II, III, IV, V, VI and VII.

A rod 20 is loosely supported in the sleeve member 13 and an opening in one wall of the recess 15 and is surrounded by a helical spring 21, the respective ends of which engage one end of the sleeve member 13 and a collar 22 on the rod 20. The sleeve member 13 is provided with a pawl 23 the free end of which engages the ratchet wheel 18 to impart rotative movement to the cam 16 as the pin 12 and its sleeve member are moved toward the cam by the thermostat when subjected to a critical temperature.

The operation of the apparatus thus far described is as follows: Assuming that the main-line switch 4 is closed, current will be supplied to the heating unit 2, provided the cam 16 is set in any one of the positions I to VII, inclusive, as indicated by the pointer arm 19. If the arm 19 is in position I, a single expansion of the thermostat will cause the pawl 23 to engage the ratchet wheel 18 and thus turn the cam until the end of the rod 20 drops into its recess 24.

If the pointer arm is set to indicate any other position, except the "Off" position, the operation will recur a corresponding number of times until the end of the rod 20 drops into the cam recess 24.

It will be understood that the maximum number of circuit-opening and closing movements may be greater or less than seven, as may be found desirable or convenient. It will also be understood that the controller 11 will be similarly actuated when fluid is utilized as a pressure agent or as fuel.

The modification shown in Figs. 6 to 9, inclusive, differs from the device shown in the preceding figures in minor details but not in principle. In this modification, one end of the member 8 is provided with a pawl 25 that engages one or another of a set of ratchet teeth 26, with which the corresponding end wall of the chamber 7 is provided, when expansion by reason of a critical temperature or pressure occurs. The device 8 is provided with a rod 27 which has an arm 28 that engages a ledge or platform 29 having scale marks which co-operate with the end of the arm 28 to indicate the number of repeat operations for which the device is set. The rod 27 is provided with a head 30 for manual manipulation to set the arm 28 in accordance with the number of repeat operations desired.

When the head 30 is pulled out, it may be rotatively actuated to cause the pointer arm 28 to slide over the platform 29. This operation locks the left-hand end of the thermostat against longitudinal movement, but still permits the entire member, consisting of thermostat 8, rods 12 and 27, pointer 28 and handle 30 to be moved rotatively. This also turns on the electricity or other source of energy in the control box 11. Assuming that the handle 30 has moved the pointer 28 to the first position shown in Figures 7 and 9, the pawl 25 will stand, with reference to ratchet notches 26, as shown in Fig. 7. As the thermostat expands by reason of the oven, its contents or other device reaching a predetermined temperature, condition or pressure, the rod 12 is pushed to the right, as shown in Fig. 8, to interrupt the source of energy controlled from the box 11, and, at the same time, pawl 25 engages ratchet 26 to rotate the member 8, rod 27, pointer 28 and handle 30 to the position shown at 28' (Fig. 9) which is approximately half way between position 1 and the "Off" position. With the pointer 28 still on the platform 29, the left-hand end of member 8 is still locked against longitudinal movement so that, when the member 8 contracts it will draw the bar 12 with it and again turn on the source of energy controlled from the box 11. The cycle just described constitutes one repeat of the controller. The next cycle, which is the same as the one just mentioned, moves the pointer 28 off the platform 29, releasing the left-hand end of the member 8 from longitudinal locking. In this position, the contracting of the member 8 will not exert sufficient energy on the rod 12 to turn on the source of energy controlled from the box 11.

In the apparatus shown in Figs. 1 to 8 and hereinbefore described, the thermostat 8 is adapted to exert sufficient force to directly actuate the controlling device to which it is connected but a thermostat of the bi-metallic-strip type is not usually capable of exerting sufficient force to perform such function.

An example of suitable apparatus for utilizing my invention in connection with a thermostat of the bi-metallic-strip type is shown in Figs. 10 and 11 in which the thermostat 31 has one end attached to a suitable stationary support 32 and its other end provided with a block 33 one side of which is provided with two stop lugs 34 and 35. A drum 36 is mounted upon a spindle 37 that is rotatively supported in suitable bearings 38. A cord 39 is wound upon the drum 36 and its free end is attached to a weight 40, although the well known spring equivalent may be utilized, if desired. Two long arms 41 project in opposite directions from one end of the drum 36 and two relatively short arms 42 project in opposite directions and at right angles to the arms 41 and also in a different plane.

One contact terminal 43 for an electric circuit 44 is located between the thermostat head 33 and the drum 36, the other side of the circuit being connected to the drum by means of a suitable contact device. When the parts are in the positions indicated in the drawing, the circuit 44 is closed and the heat to which the thermostat 31 is subjected is below the critical or maximum value. When the temperature to which the thermostat is subjected reaches the critical value the thermostat will bend upwardly until the lug 33 is raised above the lateral projection on the end of the upper arm 41, whereupon the weight 40, acting through the cord 39, will turn the drum 36 until the projection on the end of the right-hand short arm 42 engages the stop lug 35. Movement of the long arm 41 out of engagement with the contact device 43 will interrupt the circuit 44 which will remain interrupted until the other long arm is moved into engagement with it because the short arms are in a laterally displaced plane of movement. As the temperature to which the thermostat is subjected falls, the thermostat will return to its original position, thus releasing the short arm 42 and permitting the weight, cord and drum to turn the other long arm into engagement with the contact device 43, its movement being arrested by the engagement of its end projection with the stop lug 34.

The operation just described will be repeated until the cord 39 is completely unwound from the drum 36 or until the weight 40 comes to rest upon a properly located base. The number of repeat operations may, of course, be predetermined by the number of turns of cord on the drum or by the location of a base to receive and support the weight 40.

The specific devices set forth are in no sense restrictive, as regards form or arrangement, it being obvious that variations and modifications other than those specifically shown may be employed within the scope of my invention provided they fall within the limits imposed by the prior art and the appended claims.

I claim as my invention:

1. The combination with a controller, of a thermostat for actuating said controller when subjected to a critical temperature, a cam and a spring-actuated means for re-setting said controller to its original position when normal heat conditions are restored, and means co-operating with said cam and spring-actuated means for ensuring a pre-selected number of said operations.

2. The combination with a controller, of a thermostat for actuating said controller when subjected to a critical temperature, a cam and a spring-actuated means for re-setting said controller when normal heat conditions are restored, and means for adjusting said cam to ensure operation of said controller one or more times, as may be desired.

3. The combination with a controller, of a thermostat for actuating said controller when subjected to a predetermined critical degree of temperature, a cam and a spring-actuated means for re-setting said controller upon a predetermined reduction in the temperature to which the thermostat is subjected, and means for selecting and ensuring the desired number of controller operations.

4. The combination with a controller, of a thermostat for actuating said controller when subjected to a predetermined degree of heat, means for re-setting said controller upon a predetermined reduction in the heat to which the thermostat is subjected and for selecting and ensuring the desired number of controller operations, said means comprising a cam and ratchet-and-pawl mechanism.

5. The combination with a controller, of a thermostat for actuating said controller when subjected to a predetermined degree of heat, a spring-actuated device for re-setting said controller upon a predetermined reduction in the degree of heat to which the thermostat is subjected, a cam co-operating with said device to ensure the desired number of controller operations, ratchet-and-pawl mechanism and setting and indicating devices for said cam.

6. The combination with a controller, of a thermostat for actuating said controller when subjected to a predetermined degree of heat, a spring-actuated device for re-setting said controller upon a predetermined reduction in the degree of heat to which the thermostat is subjected, a cam co-operating with said device to ensure the desired number of controller operations, ratchet-and-pawl mechanism for actuating said cam, a cam-setting indicator arm and a scale surrounding said cam and said indicator arm.

In testimony whereof, I have hereunto subscribed my name this 12th day of Oct. 1922.

MARSHALL W. HANKS.